(12) United States Patent
Goheen et al.

(10) Patent No.: US 8,162,568 B2
(45) Date of Patent: Apr. 24, 2012

(54) THERMOGENERATOR TO REMEDIATE CONTAMINATED SITES

(75) Inventors: Bill Goheen, Goshen, IN (US); Ronald L. Klaus, Goshen, IN (US); David L. Hagen, Goshen, IN (US); Gary Ginter, Chicago, IL (US); Allen McGuire, Elkhart, IN (US); Timothy Naylor, Chicago, IL (US)

(73) Assignee: Vast Power Portfolio, LLC, Elkhart, IN (US)

( * ) Notice: Subject to any disclaimer, the term of this patent is extended or adjusted under 35 U.S.C. 154(b) by 681 days.

(21) Appl. No.: 11/908,762

(22) PCT Filed: Mar. 14, 2006

(86) PCT No.: PCT/US2006/009278
§ 371 (c)(1),
(2), (4) Date: Jun. 3, 2008

(87) PCT Pub. No.: WO2006/099471
PCT Pub. Date: Sep. 21, 2006

(65) Prior Publication Data
US 2009/0028645 A1    Jan. 29, 2009

Related U.S. Application Data

(60) Provisional application No. 60/661,985, filed on Mar. 14, 2005.

(51) Int. Cl.
*B09C 1/02* (2006.01)
*B09C 1/06* (2006.01)
*E21B 43/243* (2006.01)

(52) U.S. Cl. ............ 405/128.3; 166/268; 166/302; 166/306; 210/805

(58) Field of Classification Search .... 405/128.1–128.3; 588/320; 166/268, 302, 305.1, 306, 310; 210/170.07, 765, 805
See application file for complete search history.

(56) References Cited

U.S. PATENT DOCUMENTS

| | | | |
|---|---|---|---|
| 4,628,835 A * | 12/1986 | Wollner | 588/320 |
| 4,834,178 A * | 5/1989 | Knecht et al. | 166/261 |
| 5,340,236 A | 8/1994 | Ikenberry | |
| 5,360,067 A | 11/1994 | Meo, III | |
| 5,375,539 A | 12/1994 | Rippberger | |
| 5,655,852 A * | 8/1997 | Duffney et al. | 405/128.2 |
| 5,709,505 A * | 1/1998 | Williams et al. | 405/128.2 |
| 5,836,718 A | 11/1998 | Price | |
| 6,289,666 B1 | 9/2001 | Ginter | 60/39.05 |
| 6,564,556 B2 | 5/2003 | Ginter | 60/775 |
| 2004/0238654 A1 | 12/2004 | Hagen et al. | 237/12.1 |
| 2008/0069640 A1 | 3/2008 | Haemers et al. | |

FOREIGN PATENT DOCUMENTS

WO    WO 99/46484    9/1999

OTHER PUBLICATIONS

International Search Report issued May 21, 2008.
Written Opinion issued May 21, 2008.

* cited by examiner

*Primary Examiner* — Tara Mayo-Pinnock
(74) *Attorney, Agent, or Firm* — Ostrolenk Faber LLP (57) ABSTRACT

A remediation system for decontaminating a polluted site that delivers a remediation fluid to the polluted site and receives a contaminated effluent from the polluted site. The system includes a reactor that receives the contaminated effluent and generates an exit fluid stream and a first flow control mechanism coupled to the outlet of the reactor that releases a controlled portion of the exit fluid from the system, and delivers the remaining portion of the exit fluid as the remediation fluid, or delivers the remaining portion to a second flow control mechanism for combination with a controlled quantity of the second reactant to form the remediation fluid.

39 Claims, 8 Drawing Sheets

THERMOGENERATOR TO REMEDIATE CONTAMINATED SITES

PRIORITY INFORMATION

CROSS REFERENCE TO RELATED APPLICATION

The present application is a 35 U.S.C. §§371 national phase conversion of PCT/US2006/009278, filed Mar. 14, 2006, which claims priority of U.S. Provisional Patent Application No. 60/661,985, filed Mar. 14, 2005, the disclosure of which has been incorporated herein by reference.

BACKGROUND OF THE INVENTION

1. Field of the Invention

The invention relates in general to methods of remediating a contaminated site and of destroying contaminants.

2. Description of the Related Art

Figure 9:
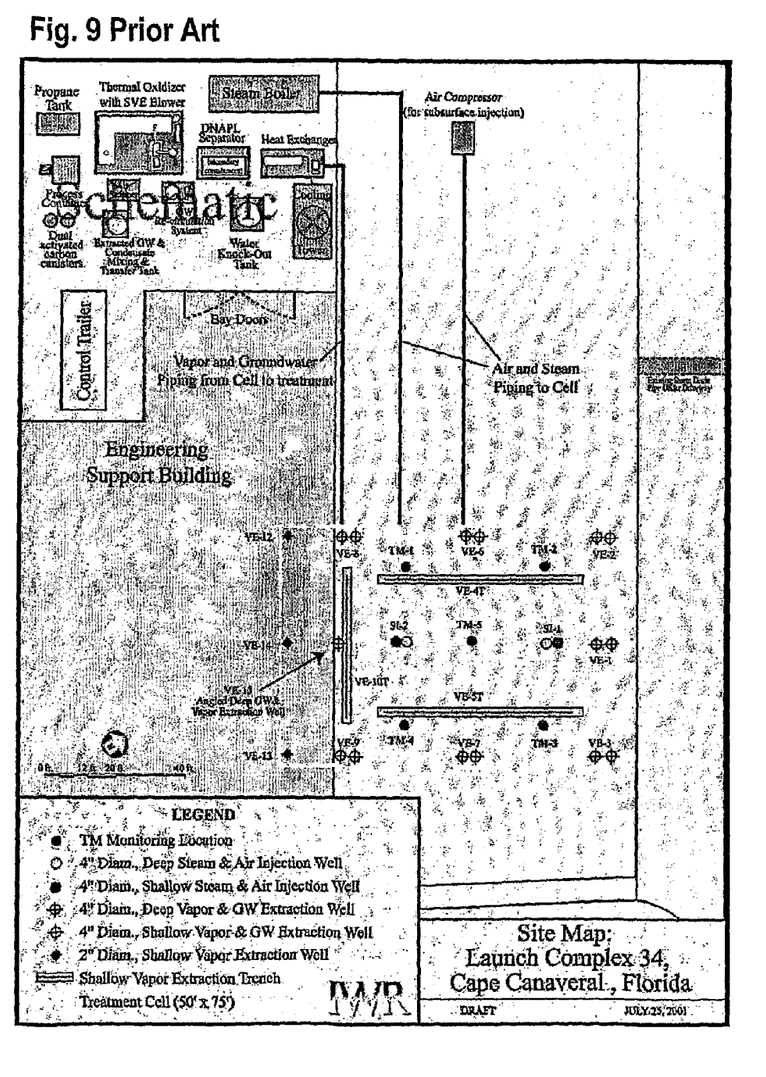
FIG. 9 depicts the known In-situ Thermal Remediation Demonstration Project, at Cape Canaveral, Fla.
Figure 10:
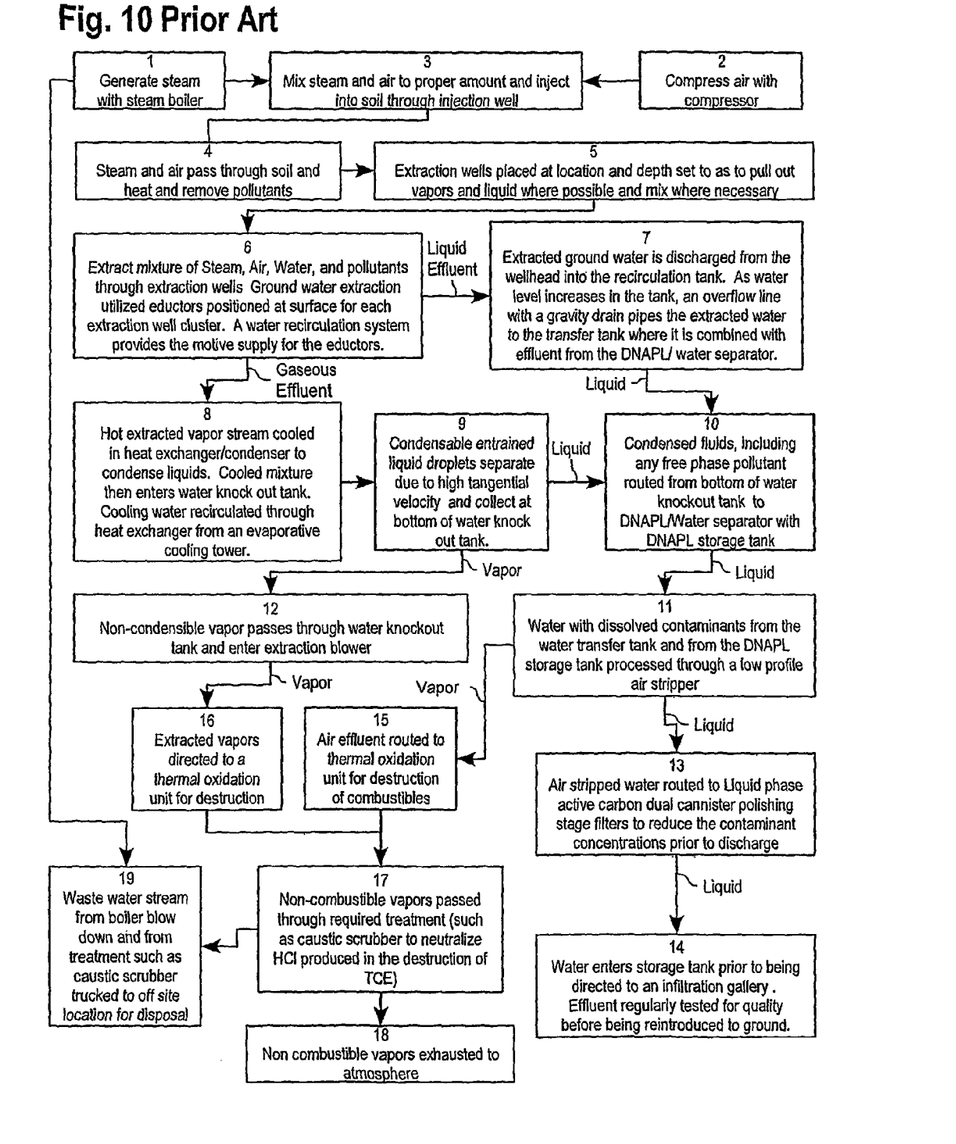
FIG. 10 depicts an example of a known remediation system layout.

Currently steam is being used to clean up contaminated or remediation sites. FIGS. 9 and 10 show a common configuration of a current art treatment system, in this case the system used to clean up a NASA site at Cape Canaveral. Forming steam using electricity is expensive, so steam is commonly generated using a standard Heat Recovery Steam Generator (HRSG) unit. The generated steam is commonly injected into a delivery well, optionally with the addition of air. This delivers heat into the ground and down to various subsurface levels where the pollutants are located. This steam then passes through the soil toward separate vapor and ground water extraction wells. As it moves it mobilizes and removes a portion of the polluting or contaminant substances. The steam, or steam and air, are driven through the soil by the injection pressure, and optionally by a vacuum at the extraction wells. This vapor containing fluid and aqueous fluid carries with it various soil pollutants, as well as water which may contain dissolved components. As the fluid moves into the extraction wells, up to the surface and on to the treatment system, it can have gaseous and/or liquid phases.

The effluent fluid withdrawn from the extraction wells typically passes through a series of process steps to separate gaseous and liquid phases and to remove the pollution contents from the gaseous and liquid components. The removal of the pollution content is typically accomplished by incineration, but other purification processes can be used, instead, or in addition. The resulting purified fluids are then returned to the environment via the air, land, or water. The heat of combustion resulting from the incineration process is typically lost.

Normally the fluid is taken from the extraction well into a heat exchanger/condenser to cool it to below the dew point of the water before it passes into a water knock-out tank. This heat exchanger also requires a cooling tower and coolant transfer pump. After separation, the gaseous and liquid streams pass through a complex array of treatment devices.

Another practice in soil remediation is to produce steam, mix it with air and inject the mixture into the soil. The Final Report on the clean up of NASA's Cape Canaveral Launch Site 34, page 10, discusses this in a specific application:

"The rational for co-injection of air, based on published bench-scale and numerical modeling studies (Betz et al., 1998; Betz et al., 1997; Itamur, 1996; Kaslusky and Udell, 2002; Schmidt, et al. 1998) is that the mixture of steam and air creates a broader thermal front with a larger volume of air saturated with contaminant, thereby inhibiting condensation of the contaminant and formation of NAPL at the leading portion of the thermal front. The principle is that co-air injection produces an extended thermal front, spreading out the isotherms, to create a larger volume within which contaminants can be held in vapor. The air/steam mixture reduces the injection temperatures to the subsurface, and the co-injected air simultaneously increases the carrying capacity of contaminant in vapor. The optimal ratio of air to steam is based on expected concentration of contaminant, and the vapor pressure of the contaminant. Higher concentrations need greater volumes of air in order to have enough carrying capacity to inhibit condensation."

Another known process is referred to as recompression. This process uses a fluid to add further pressure to the injection well to force the wanted fluids to the extraction wells. This is often done with hot gas and/or steam which has been heated on the surface using a combustion system or by combusting a hydrocarbon fuel down within the well.

All of these technologies have one or more disadvantages such as complexity leading to reliability problems, high cost, and occupation of large areas. For example, producing the steam needed for the recompression process requires further equipment such as heat exchangers, pumps, compressors, with major quantities of energy needed operate this additional equipment. This increases operating and capital costs, and equipment footprints, while reducing efficiencies.

Thus, a need still exists for improvements in the art of decontamination of polluted sites, and safe disposal of the removed contaminants.

SUMMARY OF THE INVENTION

The present invention seeks to meet this need by providing a system and method which utilizes the contaminants from the pollution site itself to provide part of the energy for the remediation process. Thus, according to one aspect of the invention, an extraction fluid is produced by a suitable reaction process, and is delivered to a pollution site, which may be underground, or on the surface, and may include soil and surface and/or sub-surface water. This may be done using conventional injection wells, or by surface delivery. The extraction fluid is preferably tailored for the specific types of pollutants to be remediated, and may include a quantity of a diluent added during or subsequent to the reaction process.

The extraction fluid interacts with the contaminants in the site, and the now polluted extraction fluid is withdrawn. After further processing as needed, at least a portion is added to the reaction process originally used to generate the extraction fluid.

According to a second aspect of the invention, when the pollutants include a substantial quantity of combustible hydrocarbons, which is true in most situations, the extraction fluid is generated by a combustion process which utilizes the combustible pollutants as fuel. This not only provides energy for the remediation process, but also incinerates the pollutants. In one preferred embodiment, the remediation system is designed around a combustion process. Other suitable reaction processes and systems are also expressly considered to be within the scope of the invention.

According to a third aspect of the invention, the extraction fluid is generated by combustion using a high efficiency, low pollution combustion system capable of burning low grade fuels. This combustion system is also preferably capable of generating large quantities of steam through injection of water in liquid and/or vapor form directly into the combustion process. One especially attractive system for this purpose is the so-called VAST combustion system. This system, and methods of using it for generating heat energy, are described in commonly owned U.S. Pat. Nos. 6,289,666B1 and 6,564,556B2 and PCT/US99/05271 and WO99/46484 and published US Patent Application 2004/0238654, the contents of which are hereby incorporated by reference.

Further according to the third aspect of the invention, a fluid including products of combustion and steam generated by a VAST combustor or thermogenerator, along with any additional desired steam and/or liquid water, is introduced into the contaminated site through suitable injection wells, or by other suitable means, and travels through the earth to a point of recovery, extracting liquid and solid pollutants. The resulting polluted effluent fluid which results is drawn out of the ground. After optional separation, and cooling, if necessary, and optional partial decontamination, at least a portion of the effluent fluid is delivered to the combustion system. The combustible components become part of the fuel for the combustion process, thereby destroying most of the extracted liquid or gaseous pollutants, and water content becomes part of the fluid exiting the combustor, along with the water generated by the combustion of hydrogen-containing fuel and pollution components.

A major portion of solid non-combustible pollutant components delivered to the combustor are removed after combustion and/or are extracted from any portion of the exit stream that is not delivered to the contaminated site. VAST combustion systems as described above, are very efficient, and the exit stream exhibits very low levels of CO and NOx, and pollutant components from the contaminated site. Any portion of the combustor exit stream which is not delivered to the remediation site is therefore capable of being safely released into the environment in compliance with legislative and/or regulatory requirements.

The hot extraction fluid delivered to the contaminated site typically heats up the contaminants, making them less viscous and therefore more mobile, facilitating extraction of the contaminated fluid.

According to a fourth aspect of the invention, liquid water or steam may be added to the combustor exit stream at one or more down stream locations for dilution and/or cooling, and to produce additional steam for inclusion in the remediation fluid.

According to a fifth aspect of the invention, heat is extracted from the combustor exit fluid, and reused before the extraction fluid is delivered to the contaminated site. This may be accomplished quite efficiently by a system and method in which the reactor exit fluid is split between a HRSG and a "cooling tank". The heat recovery system transfers heat from the reactor exit fluid into a diluent stream, such as water, which is thereby heated and/or vaporized, and may be mixed with another portion of the combustor exit fluid or delivered into the combustor. The cooled reactor exit fluid stream may then be exhausted.

The reactor exit fluid directed to the cooling tank may also transfer heat by direct contact with a diluent to produce a mixture of gas, vapor and optionally liquid. This mixture may be combined with the heated fluid from the heat recovery system to form the remediation fluid.

Reuse of a portion of the reactor system exit fluid in the remediation process beneficially reduces the makeup fuel or energy required. It also reduces the equipment required.

Where a combustion process is employed, use of the VAST combustion system identified above is preferred, because it can operate efficiently using fluids with a high water content. Thus, effluent streams with high ratios of water to combustibles (whether in liquid or gaseous form), may be recovered from the contaminated site and processed directly without the need to separate out the water.

According to a sixth aspect of the invention, utilization of reactive components of the polluted effluent fluid significantly reduces the cost for energy required for generation of the extraction fluid, and may even enable reprocessing contaminant hydrocarbons into a marketable product, (e.g., as a fuel for use off site) where not all the reactive components of the effluent fluid are required to power the remediation process itself. Alternatively, the excess energy available can be used to do mechanical work on site. For example, a combustor can provide an energetic product fluid to drive a turbine to drive a compressor and or generate electricity for use on site or for sale. At the same time, destruction of the contaminants on site eliminates transportation costs and very high off site treatment or disposal costs.

BRIEF DESCRIPTION OF THE DRAWINGS

The exact nature of the invention and other features and advantages thereof will become apparent from the detailed description which follows, and with reference to the drawings, in which.

Throughout the description, like parts and fluid streams bear like reference numerals.

DETAILED DESCRIPTION OF THE PREFERRED EMBODIMENT

General:

In the description which follows, the pollutants are assumed to include a substantial quantity of combustible hydrocarbons, and the primary energy generation process will be a combustion process. As such, the presently known best mode of practicing the invention utilizes the VAST combustion system described in the above-identified patents, the invention will be described in that context. It should be understood, however, that other reaction systems and processes capable of generating the needed remediation fluid, and of converting the extracted contaminant into a safely disposable form can alternatively be employed.

Figure 1:
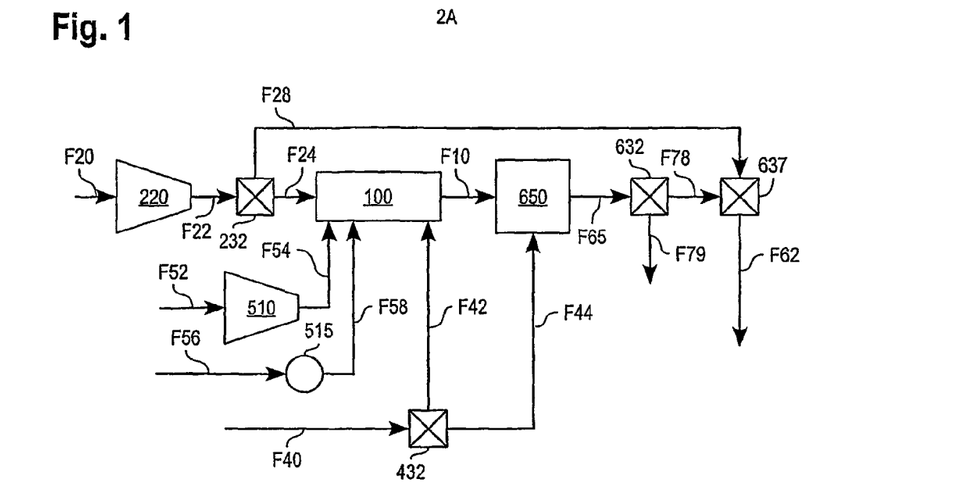
FIG. 1 depicts the basic organization of a remediation system according to the invention which utilizes combustion system and a cooling chamber.

Turning now to FIG. 1, a remediation system according to the invention, generally denoted at 2A, provides remediation fluid F62 for delivery into the ground within or near the contaminated site. Remediation fluid F62 comprises products of combustion and preferably includes steam. It optionally includes a steam-air combination, and optionally liquid water, as described more fully below.

For delivery of the remediation fluid, one or more delivery wells may be sunk into the ground, and an effluent fluid containing extracted contaminants is retrieved from one or more extraction wells. A compressor, pump, vacuum pump or similar pressurizing device configured to create a differential pressure is preferably used to facilitate recovery of the effluent fluid.

In some instances, the remediation fluid may be delivered directly into the ground, or into contaminated bodies of water. Pollutant-containing effluent may also be recovered from the ground or water surface in some instances.

Optionally, separate delivery wells may be used to inject multiple fluids into the soil or water. The delivery wells are preferably configured to provide the desired fluid pressure, flow rate, and/or flow composition, to move the fluid into and through the contaminated site to the desired remediation location to desirably recover contaminants entrained in a contaminant fluid.

However recovered, at least a portion of effluent fluid is processed, as described below to separate it into a gaseous/vapor component F52 and liquid component F56.

These are fed separately into a reactor 100 as separate fluid streams F54 and F58, respectively. These may be pressurized by a gas compressor 510 and a fluid pump 515 respectively, or similar devices to provide a positive flow through the reaction system.

Where the reaction process is combustion, the VAST combustion system described in the above-identified patents is preferably employed as reactor 100. An oxygen-containing fluid stream F24 is provided to burn the combustible contaminant components along with any additional fuel to produce an exit fluid stream F10 containing products of the reaction. e.g., steam, carbon dioxide, other reaction products, and non-condensible or residual gases such as nitrogen, argon and oxygen. Fluid stream F24 can be ambient air (compressed if desired), oxygen-enriched air, or even pure oxygen under certain circumstances.

FIG. 1 also shows an optional splitter 232 which permits a portion of the incoming oxygen-containing fluid F20 to be diverted to a bypass stream F28 for delivery to a mixer 637 for adding air to remediation fluid F62.

Using the VAST combustion system allows precise control of combustion parameters and fluid inputs to produce an exit stream of the desired exit temperature, and containing such low levels of pollutants such as CO and NOx that it can safely be released into the atmosphere under even the most stringent clean air regulations.

The combustor exit fluid stream or product fluid F10 may be processed further, as described below, and then delivered to the remediation site as a remediation fluid F62 to assist in mobilizing contaminants for extraction.

The VAST combustion system is capable of operating with large quantities of injected water (in liquid or gaseous form). Accordingly, a coolant fluid F40, which may include water and/or water vapor, and/or steam in selected proportions, may be delivered to a splitter 432, one outlet of which provides a coolant stream F42 to combustor 100 to cool the combustion process and produce additional steam in exit fluid F10 for the remediation process. A second outlet of splitter 42 may provide a coolant stream F44 to a cooling chamber 650, as now described.

Although the VAST combustor can function even with large quantities of injected water, and accordingly generate large quantities of steam at a desired exit temperature, additional steam and/or cooling may be desired. For that purpose, cooling chamber 650, which may be of any desired or convenient construction, is used to transfer heat from combustor exit fluid stream F10 to coolant F44, for example, by direct contact, to generate the additional required steam in an diluted outlet fluid stream F65. This passes through a splitter 632, an outlet of which feeds a fluid stream F78 to a mixer 637. Mixer 637 may also receive an oxygen-containing fluid stream F28. At least a portion of the resulting mixture of the combustor exit fluid F10, the additional steam produced in cooling chamber 650, and any added oxygen-containing fluid F28 constitutes the remediaton fluid F62 in this configuration.

Any portion of the cooling chamber exit fluid F65 not needed at the remediation site is bled out of the system via splitter 632 as bleed fluid stream F79. Alternatively, a portion of combustor exit stream F10 can be vented directly (not shown).

In some embodiments, it is preferable to adjust the properties of the fluid to be injected into the remediation site. Thus, a portion of air stream F20 may directed by a splitter 232, and diverted as a by-pass flow F28 directly to mixer 637 for combination with fluid stream F78. The ratio of exit fluid F10, coolant F40, F42 and F44, and oxygen-containing fluid or air F20 and F28 are preferably controlled to produce a tailored remediation fluid F62 for delivery to the remediation site to assist in recovery and extraction of contaminated or contaminant fluid.

Figure 2:
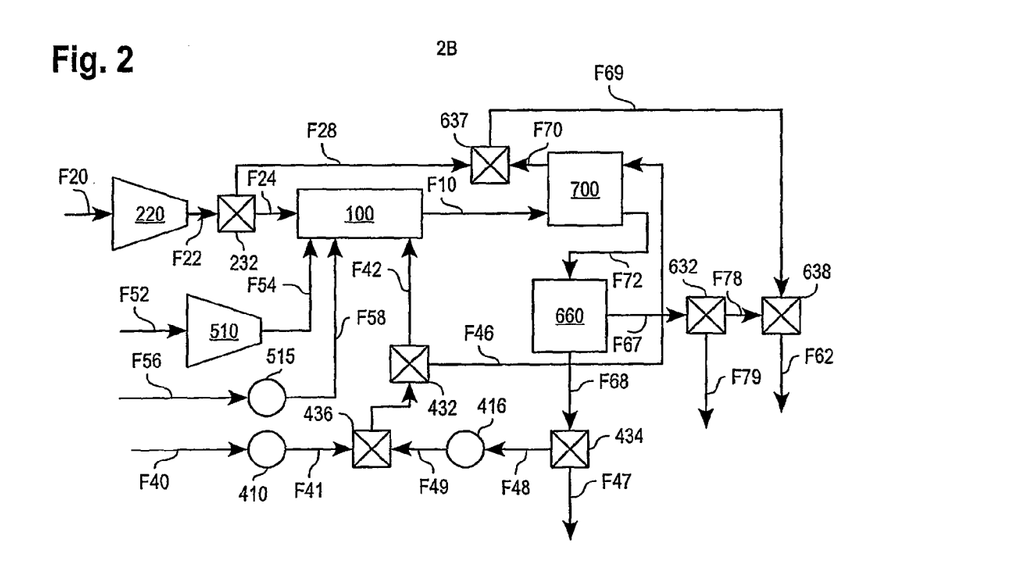
FIG. 2 depicts a remediation system according to the invention using a HRSG at wellhead pressure.

FIG. 2 illustrates a remediation system 2B which utilizes a heat recover system 700 of any suitable or desired construction, such as a Heat Recovery Steam Generator (HRSG). Here, product or combustor exit fluid F10 transfers heat to the coolant stream F46 delivered by splitter 432 to produce a hot fluid F70. This may be additional steam beyond that which is provided by combustor 100. It may be mixed with bypass oxygen-containing fluid F28 in mixer 637.

Further according to FIG. 2, the cooled combustor exit stream F72 from URSG 700 is delivered to a liquid separator 660. Here, the coolant and/or other condensibles are separated to provide a liquid stream F68 and a stream of gaseous components F67. A portion F47 of condensate stream F68 may be removed from the system through a splitter 434, with a remainder stream F48 being recycled into the remediation system via a pump 416. This may be combined with water from an external source F40 in mixer 436. A portion of this coolant flow is directed through splitter 432 to form stream F42 to cool the combustion process in combustor 100. The remainder coolant fluid F46 is delivered to the HRSG 700 to recover heat from combustor exit fluid F10.

All or part of gaseous stream F67 from the liquid separator 660 may be returned to the remediation site as part of remediation fluid F62. For this purpose, a flow path is provided through splitter 632 and mixer 638, as in FIG. 1, and bleed flow F79 vents any excess from splitter 632. The additional steam or other heated diluent F70 from the HRSG 700 is optionally mixed with the bypass oxygen-containing stream F28 as previously noted, and the resultant fluid F69 is then mixed with gas stream F78 in mixer 638 to form remediation fluid F62. Addition of the oxygen-containing fluid F28 permits tailoring the properties of remediation fluid F62, if desired. For example, by varying the oxygen/steam radio based on contaminant composition, improved contaminant extraction efficiency can be achieved.

Still referring to FIG. 2, incoming oxidant fluid F20 may be pressurized using a blower or compressor 220. This increases the gaseous fluid pressure through the entire system. The compressor is preferably controlled to increase the fluid pressure of remediation fluid F62 sufficiently for efficient injection.

Figure 3:
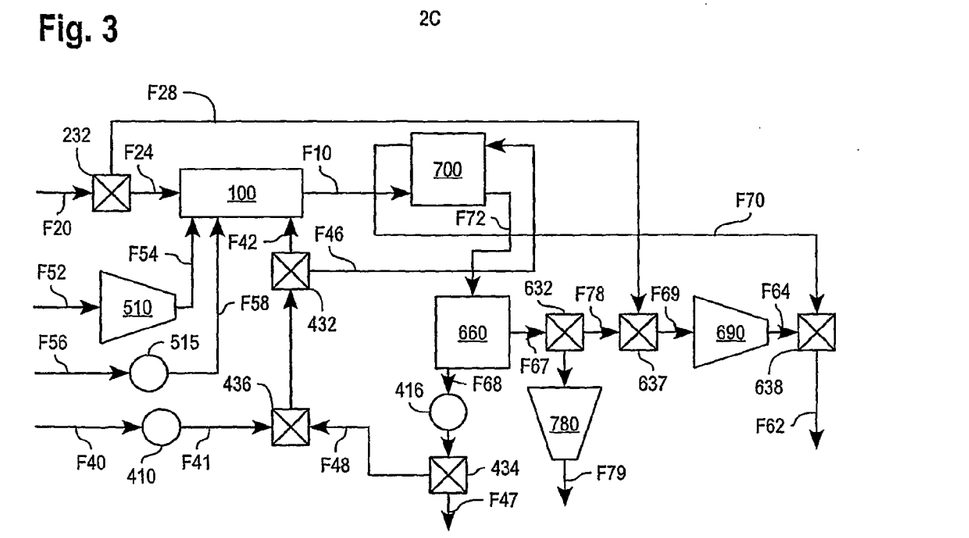
FIG. 3 depicts a remediation system according to the invention using a HRSG at ambient pressure.

In the remediation system 2C shown in FIG. 3, blower or compressor 690 is placed downstream of combustor 100 and HRSG 700. Compressor 690 compresses the tailored fluid F69 from mixer 637, which may include the cooled gaseous fluid F78 and bypass oxygen containing fluid F28. Once compressed, the gaseous flow F64 may be mixed with heated diluent/coolant flow P70 from the HRSG 700 in mixer 638 to form a pressurized remediation fluid F62.

At least a portion F24 of oxidant fluid F20 is drawn into combustor 100, optionally through a splitter 232. Any gaseous component F52 of the effluent fluid is controllably delivered into reactor 100 using compressor 510. Any liquid component F56 is controllably delivered using pump 515 as fluid F58. Liquid diluent F40 is controllably delivered using pump 410 via mixer 436 and splitter 432 with a portion to reactor 100 as F42 and another portion F46 to heat recovery system 700. After reacting fluids in reactor 100, heat is recovered from exit fluid F10 in heat recovery system 700. Condensate F68 is then separated from the cooled product fluid F72 in separator 660 using pump 416. A portion of condensate F68 is preferably returned to the combustor 100 and heat recovery system 700 via splitter 434, mixer 436 and splitter 432. Another portion F47 may be removed from the system by discharging it into the remediation site or into the environment. A portion F79 of the cooled separated fluid F67 may be removed from the system using blower or compressor 685 with another portion F78 delivered to the remediation site.

Figure 4:
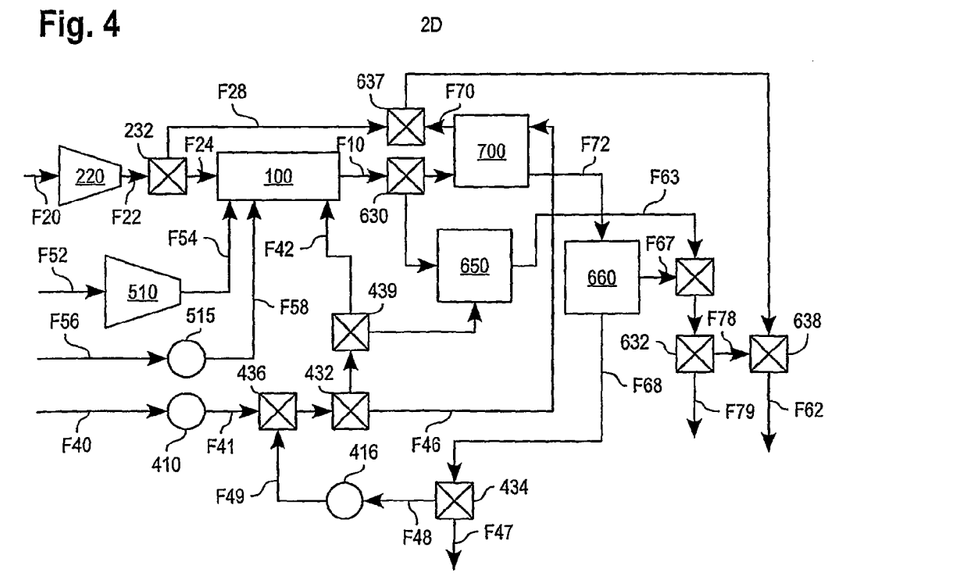
FIG. 4 depicts a remediation system using both a cooling chamber and HRSG.

FIG. 4 illustrates another preferred embodiment 2D which uses both a heat recovery system 700 and a cooling chamber 650. In this embodiment, combustor exit fluid F10 is split between the HRSG 700 and a cooling chamber 650 via splitter 630.

The incoming water stream F40 fed through pump 410 and mixer 436 is delivered to the HRSG 700, and preferably to one or both of combustor 100 and or cooling chamber 650. e.g., by using splitters 432 and 439 or the equivalent. As in FIG. 1, the portion of combustor exit fluid that is delivered to the cooling chamber 650 is preferably diluted or cooled with a portion of coolant F41 such as water. In some embodiments, the coolant is changed to vapor and/or entrained or mixed with the diluted exit fluid to form diluted fluid F63. The fluid stream F63 from cooling chamber 650 may be mixed with the gaseous stream F67 from liquid separator 660 downstream of the HRSG 700.

The use of both the HRSG 700 and a cooling chamber 650 permits use of a smaller HRSG with consequent improved cost efficiency for recovering heat for use in the remediation process. In some instances, with the reduced size of the HRSG greatly reduces the cost of the system. The heated diluent F70 from HRSG 700 may be mixed with a portion F28 of oxidant fluid F20 delivered by blower or compressor 220 via mixer 637. e.g., steam and air. This heated diluent flow is preferably mixed with the portion of fluid F63 to form the tailored remediation fluid F62. Some of the heat recovered portion F78 of product fluid F72 may be mixed with the remediation fluid F62 via splitter 632, and mixer 638 to further modify tailored remediation fluid F62. The remainder of the heat recovered product fluid F79 is preferably discharged to the environment.

Figure 5:
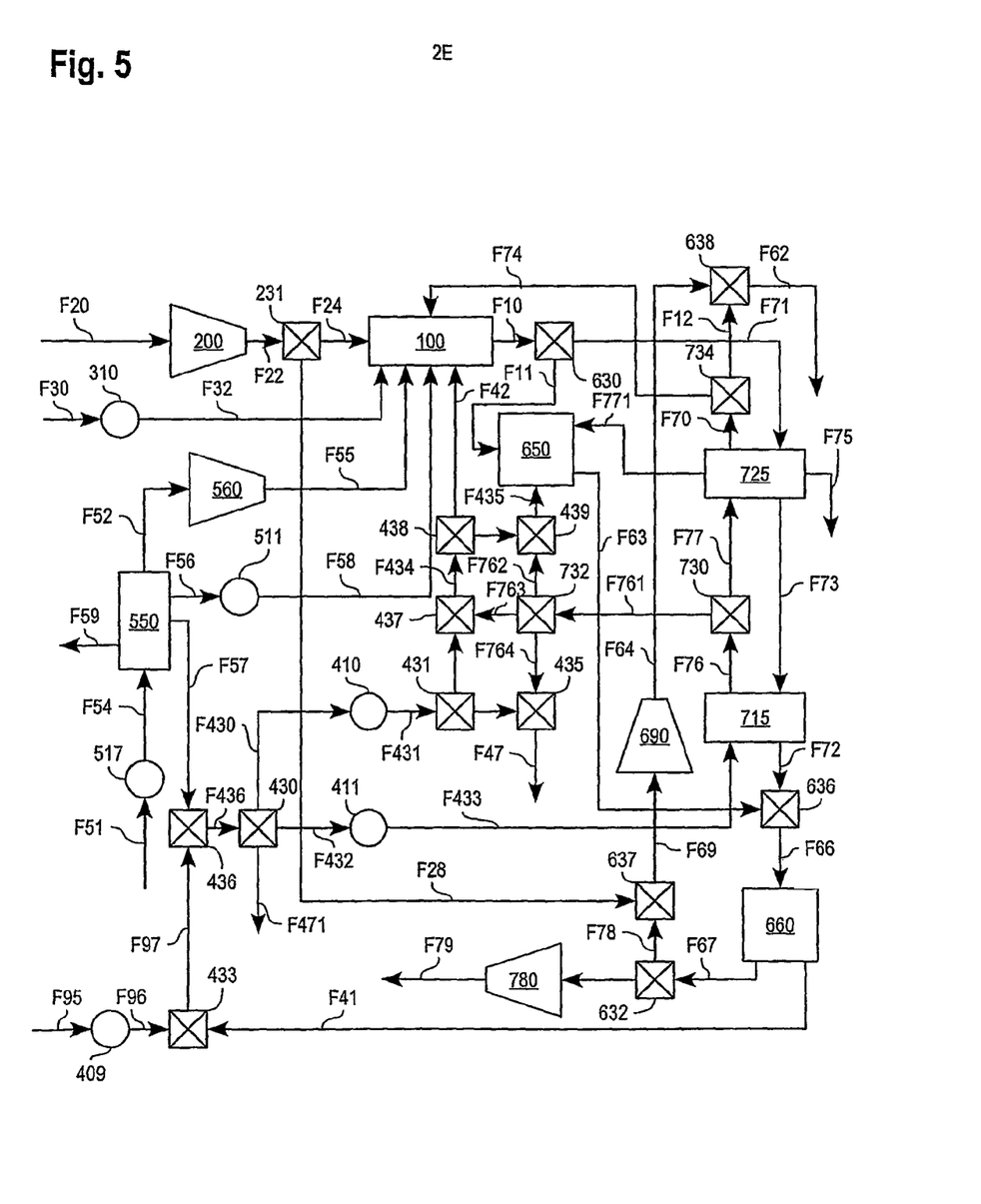
FIG. 5 depicts an efficient remediation system incorporating various features according to the invention.

In the embodiment shown in FIG. 5, generally denoted at 2E, the effluent stream F51 is delivered by a pump, 517, into a separating system, 550. Here, the effluent stream F51 is cooled and at least partially condensed using a heat exchanger. A portion of any solids present may be removed in any suitable or desired manner. The remaining fluid is then preferably separated into several components, including a gaseous component F52, an aqueous component F57, and a substantially non-aqueous component F56.

Gaseous stream F52 may be comprised of a combustible gas such as methane or other hydrocarbons, and nitrogen, carbon dioxide and argon, e.g. when these are injected into the ground as part of remediation fluid F62. Aqueous component F57 comprises at least some water and possibly contaminants and/or dissolved solids. Non-aqueous component F56 is predominantly comprised of liquid contaminants, and may include some water.

The gaseous component is treated as necessary in separating system to remove selected chemical components before delivery as gaseous stream F52. This is pressurized by blower or compressor 560, and delivered to combustor 100 as a compressed gas stream, F54.

The non-aqueous liquid component is treated as desired, is released as non-aqueous liquid F56. This may be further pressurized by pump, 511, if desired, and preferably injected into combustor 100, as reactant fluid F58. e.g., to provide destroy the contaminant and to provide fuel to the combustion process.

A portion F471 of the aqueous liquid stream F57 may be returned to the remediation site or discharged to the environment as desired. If needed, the portion F471 of the water stream leaving splitter 430 may be treated to remove additional chemical components, and if compliant with environmental standards, may be released to the environment. The remainder of the aqueous stream F430 may be pumped by a liquid diluent pump 410 to form a water stream F431 having a pressure sufficient to inject the stream into one or more of: the combustor 100 as F42, or the liquid injection pressure into the contaminated site as F47, or the water injection pressure into cooling chamber 650 as F435. This pump pressure includes whatever additional pressure is needed to overcome any pressure losses that occur as this fluid passes through any intervening pipes and equipment.

Condensate F41 from condenser 660 may be mixed in mixer 433 with makeup water F95 pressurized by pump F96 to form pressurized diluent or water F97. This diluent or liquid water flow F97, is preferably supplied through a splitter/mixer 436 as Flow F432 to pump 411. A flow of aqueous fluid may also be transferred to/from between mixer/splitter 430 and mixer/splitter 436. Some of water stream F431 may be sent to combustor 100 through splitter 431, mixer 437, and splitter 438. A further portion of water stream F431 may be delivered for injection into the contaminated site as part of fluid stream F47, through splitter 431, and mixer 435. The remainder is delivered to the cooling chamber 650, through splitter 431, mixer 437, splitter 438, and mixer 439 as part of water stream F435.

Some of the water stream F432 leaving mixer 436 may be pressurized by liquid pump 411 and raised to a pressure equal to at least the gas injection pressure of remediation fluid F62, plus additional pressure to overcome any pressure losses that will occur as this fluid passes through any intervening pipes and equipment. The pressurized water F433 is then sent to an economizer and/or condenser 715.

In some embodiments, a makeup fuel F32 may be supplied to combustor 100, pressurized as needed by a pump 310. The oxidant stream F20, which may be ambient air, oxygen-enriched, if desired, or which may even be pure oxygen, is compressed, as necessary, by blower or compressor 200. This pressurized oxidant fluid F22 preferably has a pressure equal to at least the gas injection pressure of remediation fluid F62 plus additional pressure to overcome any pressure losses that will occur as this fluid or any of its reaction products pass through any intervening pipes and equipment. At least a portion of this pressurized oxygen-containing fluid F22 is delivered as P24 to combustor 100 through splitter 231. The rest may be delivered through bypass mixer 637, and splitter 231, as bypass stream F28. Also, vaporized water stream F74 may be sent to combustor 100 from splitter 734.

In some embodiments, the fluids entering combustor 100 react to produce the hot exit gas stream F10, which contains combustion reaction products and may comprise non-condensible gases such as N2, O2 and Ar, as described above. This is delivered through splitter 630 to a cooling chamber 650 as gas stream F11, where it is mixed with a vaporized water stream F771 from HRSG evaporator/superheater 725. The hot fluid F11 is preferably mixed and cooled with water stream F435, from mixer, 439, resulting in a lowering of its temperature and typically, formation of at least some additional steam. In some embodiments, sufficient water is added to provide a liquid phase as well. From cooling chamber 650, the resulting cooled fluid stream F63 may be sent to liquid separator 660, through mixer 636, as fluid stream F66.

In some embodiments, part of the combustor exit stream F10 is delivered through splitter 630 to an HRSG evaporator/superheater, 725, as gas stream F71. There, heat is extracted which lowers its temperature and provides heat for transfer to the diluent or water stream F77, which is vaporized and/or possibly superheated to produce vaporized diluent stream F70. e.g., steam. Some of this hot vaporized diluent is delivered to cooling chamber 650 as heated or vaporized diluent stream F771 (e.g., as steam or hot water), and some may be sent to combustor 100, through splitter 734 as a vaporized coolant stream F74. Optionally some of this heated diluent may be discharged from 725 as an outlet stream F75, Gas stream F73 leaving the HRSG evaporator/superheater 725 is preferably sent to an HRSG economizer and/or condenser 715 where further heat is recovered to lower its temperature further and at least partially condenses to produce cooled fluid stream F72. At least some of the extracted heat is transferred to liquid water stream F433 to raise its temperature. Part of the resulting hot liquid coolant F76 passes through splitter 730 and splitter 732 to form hot liquid streams F761 and F762. The remainder of liquid stream F76 from splitter 730 goes to the HRSG evaporator/superheater 725 as hot liquid stream F77.

In some embodiments, the cooled fluid stream F72 leaving the HRSG economizer/condenser 715 is mixed with a cooled fluid stream F63 leaving the cooling chamber 650 in mixer 636 to form a cooled fluid stream F66 for recycling or disposal. Alternatively, the output of 650 may be delivered to mixer 638. Stream F66 may be sent to a liquid separator, 660, from which condensate or liquid water is delivered as stream F41, and cooled gas is delivered as stream F67. The water stream F41 may be mixed in mixer 433 with an additional water stream F95 which is optionally pressurized by pump 409.

In some embodiments, at least some of the cooled gas stream F67 leaving liquid separator 660 may be treated to remove residual chemical components and may then be discharged through bleed splitter 632, either directly or through exit blower 780 as discharge flow F79. Some of the cooled gas stream F78, leaving the splitter 632 may be mixed with the bypass air stream F28 in mixer 637 to form stream F69, which may be compressed by remediation injection compressor 690.

The resulting fluid stream F64 is mixed with vaporized water F12, to form the remediation fluid F62 for injection into the contaminated site.

Figure 7:
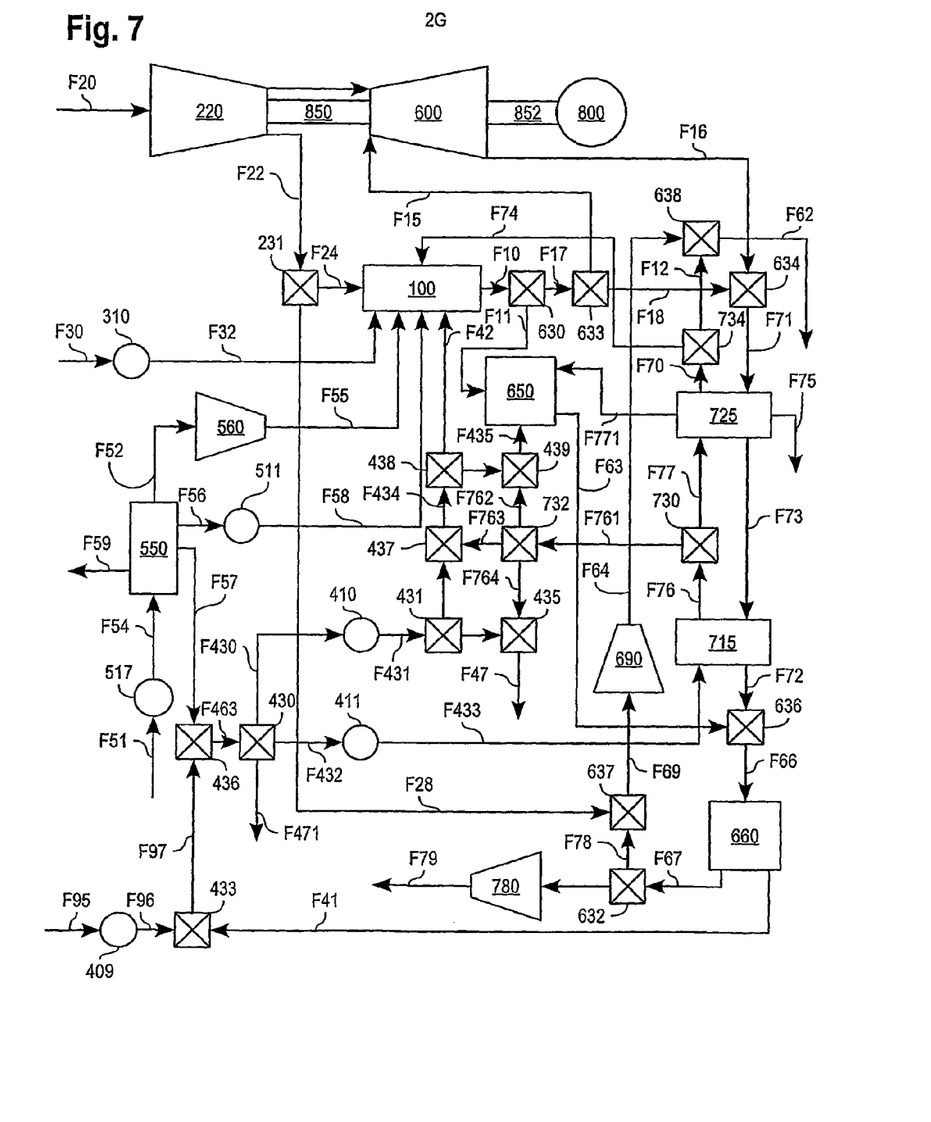
FIG. 7 depicts a remediation system with a gas turbine system.

Other embodiments may include a work unit to use at least a portion of the energy from the reaction process to produce work. The system 2G in FIG. 7 illustrates embodiment using an expander 600 to expand a stream of combustor exit fluid F15 produce mechanical work on shaft 852.

A further embodiment may include an expander-compressor shaft 850 to transfer work to the compressor 220. This work may be used to compress the air stream F20.

A portion of the compressed air stream F24 is used in combustor 100 and the resulting exit fluid F10 may be split via one or more splitters F630 and F633 to form one or more streams F17 and F15 such that at least a portion of the hot product fluid goes to the expander 600 from splitter 633.

Once the fluid is expanded in the expander 600, in some embodiments, the expanded fluid F16 may be delivered to mixer 634 where further heat may be recovered in the HRSG evaporator/separator 725.

In another embodiment, the work from the shaft 852 may be delivered to an alternator 800. The electrical energy from this alternator 800, may be used to supply energy to the pumps or other equipment of the system that require electrical energy. In another embodiment, this electrical energy may be used for energy requirements external to the remediation reaction system. This may also be used to generate further revenue, reducing the cost of system operations.

Further work producing embodiments may be configured as known in the art or as described in published U.S. published Patent Application 2004/0238654 or PCT International Application WO 2004/065763.

Referring still to FIG. 5, control of the delivery of diluent to combustor 100, cooling chamber 650 and/or economizer 715, is an important factor in controlling fluid mass, volume, composition, and temperature of the remediation fluid F62 and the fluids released to the environment. This is relevant to the other described embodiments as well, and to the delivery of non-aqueous diluents, such as for non-combustion reaction processes.

One or more of the mass flow, temperature and/or ratio of gaseous and liquid flows of water or other diluent are preferably controlled to provide temperature control. In system 2E of FIG. 5, water flow is preferably controlled by controlling splitter 731 in the heated diluent exit stream from evaporator 720 and/or a splitter 730 in exit stream F76 of economizer 715. Electrically, hydraulically, or pneumatically controlled valves may also be used for this purpose.

Water delivery may also be controlled after separation of the aqueous component of the effluent stream from the remediation site such as after a separator 550 (see FIG. 5). The ratios between at least two of these diluent streams upstream of combustor 100 are preferably controlled to control the temperature, composition, and/or flow rate of fluid F10 exiting the combustor.

Coolant flow to cooling chamber 650 is used to control temperature and/or composition of the remediation fluid F62. Liquid or vaporized water may be controlled and injected to control the temperature of the remediation fluid F62, or of a hot fluid F75 delivered to site, to improve or optimize the recovery of contaminants.

Water delivery into the remediation site is used to replace at least some and preferably all the volume of effluent fluid removed from the site and/or to dispose of diluent and/or condensate that has been collected in the remediation process. Excess diluent may be separated and released into the environment. This may be used to maintain the material balance within the remediation process and/or in the remediation site.

Further details concerning diluent control may be found in U.S. Pat. Nos. 6,289,666B1 and 6,564,556B2 and PCT/US99/05271 and WO99/46484 and published US Patent Application 2004/0238654.

As previously noted, a feature of the invention is use of components of the removed contamination as in the remediation process, along with make-up reactant, as necessary. For combustion, the flow of fuel to combustor 100 should be controlled relative to the delivered oxygen to provide stable combustion. Pumps and/or compressors, optionally with flow controls, may be used for this purpose.

Makeup reactant or fuel may be needed to provide better combustion (or for a non-combustion process) when the heating value of the contaminant used for the primary reactant is not great enough to raise the temperature of the reaction as high as required for the desired remediation. Makeup fuel may also provide heat for transfer to water in cooling chamber 650 to produce additional steam beyond what can be provided by combustion and water injection to combustor 100.

In embodiments combusting hydrocarbons in the reactor, this makeup fuel may be liquid fuel (such as diesel oil, bunker oil, jet fuel, etc) and or gaseous fuel (such as methane, natural gas, etc). This may be provided through a pump 310 from a source F30.

A second reactant for the reaction process (e.g., air, in the case of combustion) may also be controlled to provide needed cooling. With the addition of diluent for cooling, the co-reactant may be controlled to near stoichiometric ratios to improve the efficiency, net power, and/or to minimize the cost of the remediation process. This may readily be achieved in a VAST combustion system using controlled valves and one or more microprocessors or controllers.

Additional makeup fuel flow F58 can be provided to compensate for fluctuations in heat released by combustion of fuel stream F52. Fuel stream F58 is preferably controlled to maintain the combustor temperature within a prescribed temperature range. This temperature range is preferably selected with a lower temperature sufficient to adequately destroy the contaminants delivered to the reactor 100 while constraining the temperature to not greater than an upper temperature to limit formation of byproduct emissions such as NOx.

Figure 6:
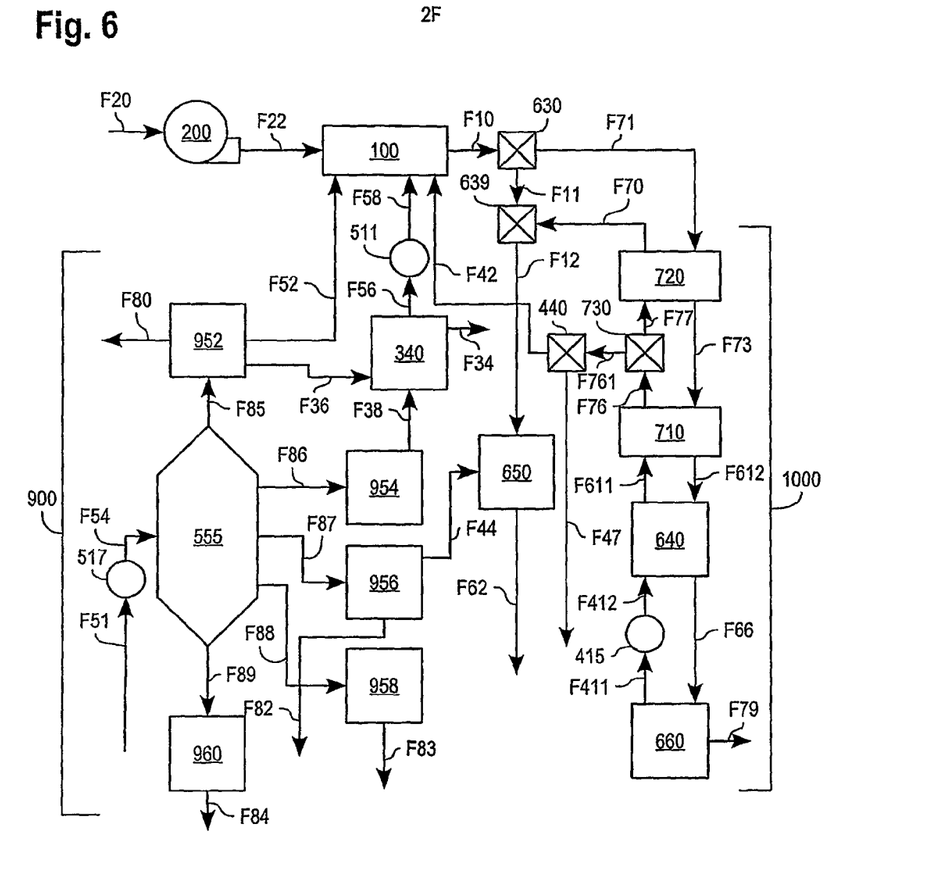
FIG. 6 depicts a remediation system according to the invention with a separator and treatment system.

Referring to FIG. 6, in remediation system 2F, heat from combustor exit fluid F10 is recovered through a heat recovery system 1000 comprising an evaporator or boiler 720 (preferably including a superheater), an economizer 710, a condensor 640 and a liquid separator 660. The heat recovery system 1000 transfers heat to a gaseous fluid F70 and/or a hot liquid F76, such as steam and/or hot water. This heat recovery system preferably recovers liquid diluent F411 from the gaseous downstream exit fluid F66 after heat has been recovered from the portion F71, e.g., as warm to cool water F411.

This warm water F411, is preferably pressurized by a pump 415 to form pressurized coolant F412 for delivery back through heat recovery system 1000. e.g., to the condenser 640 and/or economizer 710 to form a warm or hot water flow F611 and/or F76. A portion F77 of the hot water F76 is preferably separated and delivered to the evaporator 720. Another portion F42 of the hot water F76 is preferably delivered to the reactor 100 to help control one or more of the reactor temperature, the temperature of the reaction, and/or the temperature of the hot product fluid F10.

Where the diluent or water stream F47 is sufficiently hot to be beneficially mixed with the compressor exit gas F12, this is done in the dilution or cooling chamber 650.

Excess hot water F47 is preferably delivered to the remediation site, or it is discharged to the environment.

The cooled portion of the combustor exit fluid may be discharged or bled to the environment as a Bleed Fluid F79 to balance the overall non-condensible flows within the remediation system, e.g. discharging a portion of the nitrogen, argon, carbon dioxide and possibly excess oxygen. Under startup conditions or as desired, the flow F79 may be controlled to deliver a larger portion or all of the non-condensibles to the remediation site. Conversely, near the end of the project or as desired a smaller portion or none of the non-condensibles may be delivered to the remediation site. The flows F62 and/or F79 may be controlled to give fluctuating or pulsate flows to enhance contaminant recovery in some conditions.

Fluid stream F11 from splitter 630 is preferably used as the primary source for remediation fluid F62. This is preferably mixed with at least a portion of hot gaseous diluent fluid F70 or steam from heat recovery system 1000 to provide the desired steam volume and fluid temperature. The resultant fluid F12 may be further cooled, if necessary, by mixing a portion of water F44 separated from the extractant fluid F51. Hot water F761 from a splitter 440 downstream of the economizer 710 may also be used.

A contaminant or extractant fluid F51 comprising mobilized contaminants, is preferably extracted from the remediation site. This may be assisted by a pump 517 to form a pressurized or compressed contaminant fluid F54.

The effluent fluid F51 generally comprises one or more gaseous, liquid, and solid components and mixtures thereof, as previously described. These may include steam, water vapor, water, non-condensible gases, dissolved entrained or suspended solids, and contaminants. The contaminants may comprise one or more of hydrocarbons, halogenated compounds, oxygenated hydrocarbons, and nitrogen comprising compounds or fertilizers.

With further reference to FIG. 6, in this configuration, effluent fluid P51 recovered from the remediation site is preferably separated into multiple separated fluid streams of differing density using a centrifugal separator system 555 or any other suitable separation system. A settling tank may be used to separate fluid stream F51 into multiple phases generally comprising a plurality of a gaseous fluid, a light liquid phase, a medium liquid phase, a dense liquid phase, and solids.

Preferably, the separator system 555 comprises one or more centrifuges to separate the extractant fluid into multiple partially or fully separated fluids based on density. More preferably, separator system 555 comprises at least one decanter centrifuge capable of separating a composite fluid into three streams based on density. e.g., into a light fluid, a medium fluid and a dense fluid and/or a solids stream. Similarly, the decanter may form a medium fluid, dense fluid and solids stream.

The separated streams F85-F89 are preferably treated in separate treatment units. These may include a gaseous fluid treatment system 952, a light fluid treatment system 954, and medium fluid treatment system 956, a dense fluid treatment system 958, and a solids treatment system 960. In some applications, a gaseous fluid comprising non-condensibles is generally recovered as the lowest density stream. Where the contaminants include components which have a relatively high vapor pressure (low boiling point), the gaseous component will comprise a portion of these high vapor pressure compounds. Where this concentration exceeds prescribed emission rates, this light contaminant gaseous fluid is preferably treated in a gaseous fluid treatment system 952 to reduce these contaminants to satisfactory levels.

In some applications, the gaseous fluid treatment system 952 may comprise an activated absorption system such as activated carbon or an activated mineral. E.g., this may be useful where the gaseous fluid comprises a small fraction of volatile contaminants that are readily absorbed.

In other applications, gaseous treatment system 952 preferably cools or chills the gaseous separated fluid F85 to condense and separate out a portion of the contaminant using a direct contact condenser, a chiller, or refrigerator as appropriate to the desired cooling temperature.

Heat from cooling the light separated fluid F85 is preferably transferred to a heat exchange fluid for subsequent use in heating other combustor components, such as air F22 and/or water F411. Where the heat exchanger fluid is water and is sufficiently hot, it is preferably delivered to a mixer 639 or cooling chamber 650 to mix in with the combustor exit fluid F11.

Where the resulting chilled gas stream satisfies emission limits, a portion F80 is preferably discharged to the atmosphere. Such discharge F80 facilitates controlling buildup of non-condensibles within the remediation system, and may be desirable with heavier hydrocarbons or with lighter fuels where a portion of the volatile hydrocarbon fraction has already evaporated. Such discharge beneficially avoids having to further treat the extracted non-condensibles through the reactor 100 thereby reducing the flow through the reactor by about half in some instances. This also eliminates the need to heat fluid P80, and avoids loss of heat in non-condensible discharge or of recovering heat from the non-condensibles downstream of the combustor.

Any condensed contaminant is preferably recovered and may be further treated as appropriate to its composition.

The residual treatable (combustible) contaminant stream F52 is preferably delivered to combustor 100. If treatment system 952 is not used, gaseous contaminant fluid F85 may be delivered directly to combustor 100.

Where condensed contaminant stream F36 may be used as a fuel, it is preferably delivered to a fuel buffer tank 340 from which a controlled makeup fuel F56 is pressurized by pump 511 and then delivered to the reactor 100 as pressurized makeup fuel F58. This light fuel may be further supplemented by makeup fuel F38 from a light fluid treatment unit 954 as described below.

In configurations where treatment 952 by condensation or chilling is insufficient to separate out contaminant below prescribed emission limits, the gaseous fluid is preferably delivered to the reactor 100 for treatment, either as a treated contaminant comprising gas F52, or directly as the separated contaminant comprising gas F85.

In some applications, the separated gas P85 may comprise halogenated compounds that exceed emission limits. In such configurations, the separated gas treatment 952 is designed and constructed to accommodate the halogenated compounds. For example, trichloro ethylene is preferably delivered to a reactor where the light halogenated compounds are reacted with a co-reactant such as oxygen in air or oxygen enriched air. The resulting halide acids may be preferably scrubbed with alkaline solution or slurry to reduce acidic halide emissions. This process may be combined with that of treating a dense liquid phase.

The light fluid component F86 separated in separator 555 often comprises hydrocarbons less dense than water. This may include substantial quantities of hydrocarbons that may be beneficially used as fuel. For this, a light fluid treatment unit 954, is preferably used to separate out suspended solids. This may be a filter or more preferably a centrifuge.

In applications where the aqueous component F87 has little dissolved solids, the light to medium fluid separation performed in separator 555 is preferably adjusted to recover a desired fraction of the light fluid F86. This separation may include a small portion of the medium or aqueous phase sufficient to achieve the desired degree of light liquid recovery.

The treated light fluid F38 may be delivered to the buffer fuel tank 340 for use as part of makeup fuel F58 as described above. Excess treated hydrocarbons may be recovered as flow F34 for other applications.

In some applications, the light fluid component F86 may be contaminated with one or more of salts, salt water, or water with dissolved solids. Sometimes it is desirable to use the recovered hydrocarbon F38 for fuel and to reduce slag accumulation or hot section corrosion. In such cases, light fluid F38 may be further treated by washing with clean water to reduce salt concentrations, especially sodium and chloride ions. This may be done using condensate or water recovered from cooling a portion of the product fluid F71 in a condenser 640 and/or separator 660.

For applications which require a fuel without water, the washed hydrocarbon may further centrifuged to separate out an aqueous portion and reduce the residual aqueous content. Where the contaminant level in removed aqueous portion is too high to permit discharge, the separated aqueous phase may be returned to the separator system 555 for further processing.

A separated medium density liquid component F87 is preferably delivered to a medium density liquid treatment system 956. The component will typically be an aqueous phase possibly comprising undesirably high levels of dissolved and/or entrained solids. This medium liquid F87 is preferably centrifuged to separate out any solids, which may then be discharged as F82. For example, these may be returned in a slurry to the remediation site. The treated aqueous phase fluid F44 is preferably delivered to a cooling chamber 650 where it is used to cool a portion of the hot product combustor exit fluid comprising FP0, F1 and/or F12 downstream from the combustor.

In some cases, the medium density liquid F87 may comprise combustible contaminants but negligible solids. In such situations, the contaminant medium density aqueous fluid F44 may be delivered to the combustor 100 to destroy the combustible contaminants.

In other cases, the medium density liquid F87 may comprise combustible contaminants and dissolved solids. In such configurations, the liquid is preferably injected into the combustor 100 with sufficient makeup fuel F58 as needed to combust or react the contaminants.

In some cases, there may also be a higher density liquid component F88 separated in 555, which is preferably delivered to a high density liquid treatment system 958. The dense fluid F88 may comprise a halogenated compound. In such configurations, the dense fluid is preferably delivered to dense fluid treatment system 958 as required.

For solid components F89 separated from the extractant fluid, when high density liquids are also present, the solids F89 may be further treated in a solids treatment system 960.

Solids with residual dense fluid F89 may be heated to evaporate the dense fluid. The dense fluid vapor may be separately condensed and recovered. The recovered dense fluid vapor is preferably delivered to a dense fluid treatment system 958.

The separated and treated solids F84 may be discharged, preferably to the remediation site. This may be conveniently accomplished by merging them with any solids discharged from the light fluid treatment F82.

The remediation system is preferably configured or controlled such that the flow of the cooled fluid comprising non-condensibles discharged to the environment F79 is similar to that of the noncondensible gases in the effluent fluid F52 that are separated and delivered to the combustor 100. Where the noncondensible gas flow is controlled, the control is preferably provided by a valve at the gaseous discharge outlet from the heat recovery system 1000. e.g., the separator 660. These discharge flows may be negligible on startup, but increase to about half the total flow from the reactor under steady state operations (normalized for temperature.) At end of operations, the flow F62 to the site may be shut down while continuing to pump residual gas comprising fluid from the remediation site.

In some applications, the carbon dioxide formed by a combustion reaction may be sequestered underground while the remaining fluid flows may be balanced.

In highly recycled remediation processes, critical material and energy flows are preferably balanced within the system to avoid accumulating gases in the reaction system or the remediation site, and to avoid other instabilities. This may put some additional constraints on the selection of design variables that may not otherwise be obvious. e.g., while the contaminated site may not be a closed system, non-condensible gas flows within the remediation system and the contaminated site are preferably balanced on the average. This helps avoid a potentially disruptive or explosive gas buildup. It further helps to reduce pumping work.

More preferably, the net liquid volumetric flows to and from the site and within the remediation system should be balanced. This provides the further benefit of reducing the tendency to push contaminant or water containing contaminant outward from the original contaminated region.

Most preferably, material flows for all atomic species and energy flows are balanced over all the streams entering and leaving the combined system of the remediation system and the contaminated site. Writing the material balances at this level provides guidance for important flow and power controls.

With reference to FIG. 5, in one embodiment, there are eight unknown variables in six overall material balances if a material flow balance for water and non-condensibles is desired for the combined remediation site system, including the remediation system and the contaminated site. (e.g., this would increase to 10 unknowns and eight material balances if hydrogen and carbon and a hydrocarbon contaminant were included.)

That means, on an overall basis, that if two material balances are preferably specified or else calculated from any other combination of design variables, then the overall material balances preferably determine all the rest of these unknown variables no matter what the details of the internal process are. This fact restricts the choice of preferred design variables under average conditions, except for startup and shutdown or pulsating flows.

Furthermore, these preferred design restrictions are even more stringent, because not all of these variables appear in all the overall material balance equations. Each of the rows in the following table corresponds to one of the material balance equations. The columns refer to a particular unknown variable. The X's denote the appearance of a variable in an equation.

TABLE 1

| | A Flow Balance Variable Matrix | | | | | | | |
|---|---|---|---|---|---|---|---|---|
| | Mass of Fluid Entering contaminated site from | Mass of Fluid Exiting HRSG into | Mass of Fluid Exiting 430 into | Mole Fraction in Fluid returned to the contaminated site | | | | |
| | Envir. | Envir. | Envir. | $O_2$ | $N_2$ | $H_2O$ | $CO_2$ | Ar |
| $O_2$ | X | X | | X | | | | |
| $N_2$ | X | X | | | X | | | |
| $CO_2$ | | X | | | | | X | |
| Ar | X | X | | | | | | X |
| $H_2O$ | | X | X | | | X | | |
| Mole Fraction | | | | X | X | X | X | X |

As Table 1 shows, not all variables appear in all equations. For example, only three unknown variables appear in the $CO_2$ equations. Thus, if one of these is fixed, then another variable may also be fixed by the preferred overall material balance. Such a fixed parameter is no longer available to be chosen as an independent design variable for steady state operation. This may cause other variables to become fixed because of other preferred steady state material balance equations that may now contain only one unknown variable. Prescribing or controlling a potential design variable may take place by direct choice. It may also be achieved by prescribing or controlling some combination of other design variables such that there is some equation that has only one potential design variable as an unknown. The overall material and energy balance equations are among the most likely to be in that category.

As should be clear from this discussion the desired choice of design variables is important in the analysis of such a preferred steady state process.

Figure 8:
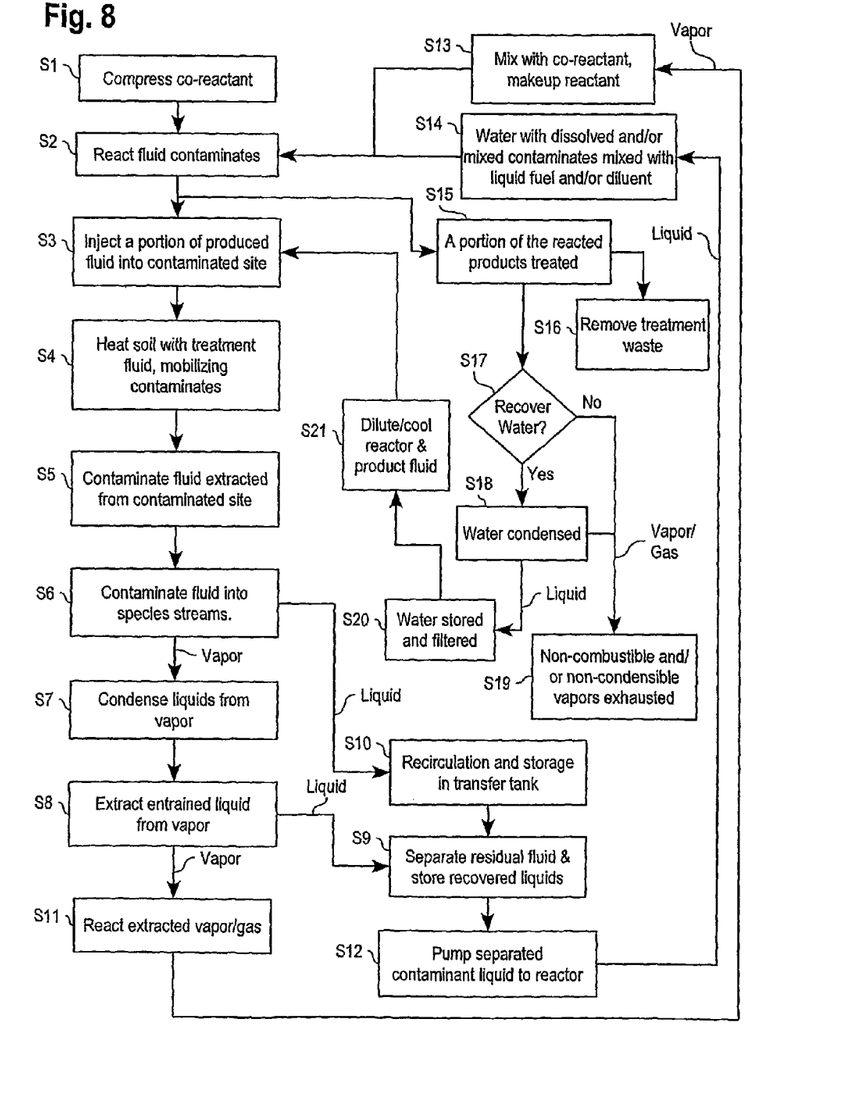
FIG. 8 depicts a process flow diagram for a representative preferred embodiment of the invention.

An exemplary VAST remediation process is demonstrated in a flow chart shown in FIG. 8.

At step S1, oxygen-containing fluid is pressurized and delivered to the combustor. At step S2, the combustible pollutants are delivered to the combustor, and burned to produce steam and to destroy the pollutants. Additional makeup reactant or fuel may be used to maintain reaction stability. Diluent is preferably used to adjust the temperature of a portion of the combustor exit fluid to within a desired range. This reaction or combustion typically produces a combustor exit fluid comprising products of reaction, vaporized diluent and non-condensible gases.

At step S3, remediation fluid is injected into the contaminated site. Additional water is added, as necessary, to control the remediation fluid temperature to within a desired temperature range. At least a portion of the exit fluid is mixed with hot water as needed, producing further steam. The resultant hot treatment fluid comprising products of reaction and diluent is then injected into the contaminated site.

At step S4, the soil is heated with treatment fluid to mobilize pollutants. At least a portion of the hot remediation fluid passes through the soil to heat the contaminants, mobilize them, and carry them to extraction wells.

At step S5, an effluent fluid comprising liquid and/or vapor contaminant is recovered from the contaminated site. This commonly comprises water, and may comprise non-condensible gas including one or more of nitrogen, oxygen, carbon dioxide and argon.

At step S6, the effluent is preferably separated into gaseous and residual fluids. In one embodiment, the extracted mixture is preferably separated into a gaseous fluid comprising gases and/or vapor, and a residual fluid comprising diluent and contaminant liquids and any dissolved materials and/or solids entrained in the extractant flow.

At step S7, liquids are condensed from the extracted vapor. The gaseous stream is preferably cooled in a condenser to liquefy a portion of contaminants and/or diluent from the gaseous stream. A direct contact condenser using a cold diluent, e.g., water, is preferably used to condense out these liquids. This preferably uses a heat pump to recover the exchanged heat and deliver it to the remediation site.

At step S8, entrained liquid is extracted from the gaseous extracted fluid and delivered to a condensed liquid buffer tank. e.g., using a mist eliminator or centrifuge.

At step S9, residual fluid comprising recovered liquids is preferably separated into multiple liquids, and optionally residual solid stream, based on density.

One or more contaminant fluids are preferably delivered into one or more buffer tanks, while the residual diluent fluid may be delivered back to the separator chamber, to fluid discharge, or to a solids discharge. e.g., separating one or more of a Dense Non-Aqueous Phase Liquid (DNAPL such as a predominantly chlorinated compound which may comprise other components), an aqueous phase that may comprise other components, and Light Non-Aqueous Phase Liquid (such as a predominantly hydrocarbon fluid that may comprise water) and storing them in one or more buffer tanks. Further liquid that has been cooled and condensed in step S7, then separated from the vapor/gaseous stream in step S8, may be added to at least one of the buffer tanks.

At step S12, liquid contaminant separated from extracted fluid is preferably pumped to the combustor.

At step S14, makeup fuel and/or water are mixed in or sprayed along with the contaminant liquid being delivered to the combustor. The flow rates for makeup fuel and water are preferably controlled relative to the delivered oxygen and contaminant liquid to keep the reaction stable and/or provide further heat sufficient to react the contaminant to a desired degree.

At step S11, extracted vapor/gas remaining after condensing and extracting the condensibles and liquids (8, 9) is delivered to the combustor and its contaminants are burned. Non-pollutant components may be discharged to the environment.

At step S13, prior to delivery into the combustor, the gaseous/vapor fluid may be mixed with air and/or makeup fuel to help keep the reaction stable and/or provide further heat.

After combustion in step S2, a portion of the reaction product stream is preferably injected into the soil at step S3. At step S15, a portion of the reaction product stream may be removed and treated for any remaining pollutants before being used for other purposes, and/or a portion may be exhausted in step S19.

At step S16, after treatment, pollutants removed from the effluent fluid are discharged or disposed of as appropriate.

Step S17, is configured or controlled as to whether water should be recovered or not.

Step S18 preferably includes heat recovery and water condensation. Heat is preferably recovered from a portion of the exit fluid comprising reaction products. Water is preferably condensed and separated from the predominantly non-condensible fluid portion.

At step S19, a portion of non-condensible fluid is discharged from the remediation system to help balance fluid flows. Non-condensibles may be discharged after the combustor, but more preferably after recovering heat from at least a portion of the exhausted gas, non-condensibles may be discharged upstream of the reactor after separating them from the extractant fluid and preferably after removing any contaminants. Alternatively, non-condensibles may be removed from oxidant fluid such as air and be discarded before processing.

At step S20, water condensed from the heat recovery system is preferably filtered and stored.

At step S21, liquid water and/or steam is delivered to the combustor and/or mixed with one or more of the fuel, oxygen containing fluid and combustor exit fluid to cool them and prevent formation of pollutants.

Although the present invention has been described in relation to particular embodiments thereof, many other variations and modifications and other uses will become apparent to those skilled in the art. For example, the splitters herein may comprise simple openings or bifurcations in a fluid duct, or they may form valved outlets, or they may be actively controlled diversion between two or more flows. It is intended, therefore, that the present invention be limited not by the specific disclosure herein, but only by the appended claims.

We claim:

1. A remediation system for decontaminating a polluted site, the system comprising:

an outlet system that delivers a remediation fluid to the polluted site under pressure;

an inlet system that receives a contaminated effluent from the polluted site;

a processing system that extracts a contaminant component from the contaminated effluent;

a reactor including a first inlet coupled to receive the extracted contaminant component as a first reactant, and a second inlet coupled to receive a second reactant comprising an oxidant;

a reactant delivery unit that delivers reactants to the first and second reactor inlets, the reactor being configured to generate an exit fluid stream containing products of the reaction of the first and the second reactants for delivery through a reactor outlet; and a first flow control mechanism coupled to the outlet of the reactor to receive the exit fluid, the first flow control mechanism being configured to release a controlled portion of the exit fluid from the system and to deliver the remaining portion of the exit fluid as the remediation fluid to the polluted site, or to deliver the remaining portion of the exit fluid to a second flow control mechanism for combination with a controlled quantity of the second reactant to form the remediation fluid.

2. The remediation system of claim 1, wherein the reactor system further includes: a third inlet coupled to receive a controlled quantity of diluent/coolant fluid for delivery into a reaction process in the reactor and/or downstream of the reaction process, whereby the exit fluid is cooled, and the diluent/coolant becomes part of the mass flow of the exit fluid.

3. The remediation system of claim 2, further including: a heat transfer device which is coupled to receive the reactor exit fluid and a further controlled quantity of diluent/coolant fluid, the heat transfer device being operative to transfer heat from the exit fluid to the received diluent/coolant fluid, to combine the heated diluent/coolant fluid with the exit fluid, and to deliver the combined fluid through an outlet thereof.

4. The remediation system of claim 3, wherein the first flow control device is connected to the outlet of the heat transfer device.

5. The remediation system of claim 3, wherein the reactant delivery unit is operative to deliver at least a portion of the contaminant gas to the first reactor inlet.

6. The remediation system of claim 1, further including: a heat transfer device which is coupled to receive the reactor exit fluid stream and a controlled quantity of diluent/coolant fluid, the heat transfer device being operative to transfer heat from the exit fluid to the received diluent/coolant fluid, to combine the heated diluent/coolant fluid with the exit fluid, and to deliver the combined fluid through an outlet thereof.

7. The remediation system of claim 6, wherein the first flow control device is connected to the outlet of the heat transfer device.

8. The remediation system of claim 1, wherein the outlet system includes an injection well formed and located to deliver the remediation fluid to the polluted site.

9. The remediation system of claim 1, wherein the inlet system includes an extraction well formed and located to receive the effluent fluid from the polluted site.

10. The remediation system of claim 1, wherein the processing system comprises a separator operative to separate the effluent fluid into components according to the content thereof, the components including a gaseous component, a non-aqueous liquid component, and an aqueous component.

11. The remediation system of claim 10, wherein: the gaseous component is comprised of contaminant and non-contaminant gasses; and the processing system comprising a gas treatment device operative to remove at least a portion of the contaminant gas from the gaseous component of the effluent fluid.

12. The remediation system of claim 10, wherein the processing system further comprises a treatment unit operative to recover liquid contaminants present in the nonaqueous liquid component.

13. The remediation system of claim 12, wherein the reactant delivery system is operative to deliver reactive constituents recovered from the gaseous and non-aqueous liquid components of the effluent fluid to the reactor.

14. The remediation system of claim 12, further including a controller for the reactor and the reactant delivery unit, wherein the controller is operative control the reactor to utilize a first reactive constituent as a primary reactant, and to utilize a second reactive constituent as a secondary reactant to compensate for variations in the primary reactant.

15. The remediation system of claim 14, wherein the recovered liquid contaminants are delivered to the reactor as the secondary reactant; and the controller is operative to control the delivery of the recovered liquid contaminants to the reactor to maintain the temperature of the reaction to within prescribed upper and lower limits.

16. The remediation system of claim 14, wherein the controller is operative to control the delivery of the first and second reactants to maintain the reaction rate greater than a minimum reaction rate needed to maintain a desired reaction temperature and reaction stability.

17. The remediation system of claim 16, wherein the controller is further operative to control the flow of diluent fluid to the reactor and/or downstream thereof to control the temperature of the remediation fluid between desired lower and upper temperature limits.

18. The remediation system of claim 10, further comprising a diluent delivery unit, operative to deliver liquid diluent to the reactor.

19. The remediation system of claim 18, wherein the diluent delivery unit is further operative to remove a portion of the diluent from the remediation system and to deliver to the remediation site as part of the remediation fluid.

20. The remediation system of claim 18, further comprising a heat recovery system operative to cool and recover heat from fluid exiting the reactor, to heat a diluent fluid, and to delivering a portion of heated diluent to the diluent delivery system.

21. The remediation system of claim 20, further including a cooling chamber operative to mix the fluid exiting the reactor with heated diluent from the heat recovery system.

22. The remediation system of claim 20, wherein the heat recovery system comprises an evaporator operative to evaporate diluent, and to deliver evaporated diluent into the reactor and/or the remediation fluid.

23. The remediation system of claim 20, wherein the heat recovery system further comprises a condensor and liquid separator which are operative to condense and collect water from the reactor exit fluid and to deliver at least a portion of the water to the diluent delivery system.

24. The remediation system of claim 10, wherein at least part of the separated aqueous component is delivered to the reactor.

25. The remediation system of claim 1, wherein the reactant delivery unit is operative to pressurize the second reactant to a pressure sufficient to inject the remediation fluid into the remediation site.

26. The remediation system of claim 1, further including a mixing unit operative to deliver and mix a controlled quantity of the second reactant with the remediation fluid.

27. The remediation system of claim 1, wherein the reactant delivery system is further operative to deliver a makeup reactant to the reactor system from a source other than the effluent fluid.

28. A remediation system for decontaminating a polluted site, the system comprising:
an outlet system that delivers a remediation fluid to the polluted site under pressure;
an inlet system that receives a contaminated effluent from the polluted site;
a processing system that extracts one or more combustible components from the contaminated effluent;
a combustor including a first inlet coupled to receive an extracted combustible component as a fuel, and a second inlet coupled to receive an oxidant fluid;
a reactant delivery unit that delivers the extracted combustible component and the oxidant to the first and second combustor inlets, the combustor being configured to generate an exit fluid containing combustion products of the extracted combustible component and the oxidant fluid for delivery through a reactor outlet; and a first flow control mechanism coupled to the outlet of the combustor, the first flow control mechanism being configured to release a controlled portion of the exit fluid from the system, and to deliver the remaining portion of the exit fluid as the remediation fluid to the polluted site, or to deliver the remaining portion to a second flow control element for combination with a controlled quantity of the oxidant fluid to form the remediation fluid.

29. The remediation system of claim 28, wherein the combustor further includes: a third inlet coupled to receive a controlled quantity of water for delivery into a combustor process in the combustor and/or downstream of the combustion process, whereby the exit fluid is cooled, and the water is vaporized, and becomes part of the mass flow of the exit fluid.

30. The remediation system of claim 28, further including: a heat transfer device which is coupled to receive the exit fluid stream and a further controlled quantity of water; the heat transfer device being operative to transfer heat from the exit fluid to the received water, to combine the heated water with the exit fluid, and to deliver the combined fluid through an outlet thereof.

31. The remediation system of claim 30, wherein the first flow control device is connected to the outlet of the heat transfer device.

32. The remediation system of claim 28, further including: a heat transfer device which is coupled to receive the exit fluid stream and a controlled quantity of water, the heat transfer device being operative to transfer heat from the exit fluid to the received water, to combine the heated water with the exit fluid, and to deliver the combined fluid through an outlet thereof.

33. The remediation system of claim 32, wherein the first flow control device is connected to the outlet of the heat transfer device.

34. A method of decontaminating a polluted site, the method comprising:
   delivering a remediation fluid to the polluted site under pressure;
   recovering a contaminated effluent from the polluted site, the effluent including remediation fluid and contaminants from the polluted site;
   delivering at least a portion of the effluent to a reactor to serve as a first reactant and a diluent, the portion of the effluent including remediation fluid and contaminants from the polluted site;
   delivering a second reactant to the reactor;
   operating the reactor to generate a reaction product-containing exit fluid stream that contains products of the reaction of the first and the second reactants;
   releasing a controlled exhaust portion of the exit fluid from the system to the atmosphere, and delivering a delivery portion of the exit fluid as remediation fluid to the polluted site, or combining the remaining portion with a controlled quantity of the second reactant to form the remediation fluid.

35. The method of claim 34, further including: delivering a controlled quantity of a diluent/coolant fluid into a reaction process in the reactor and/or downstream of the reaction process, whereby the exit fluid is cooled, and the diluent/coolant becomes part of the mass flow of the exit fluid.

36. The method of claim 35, further including: transferring heat from the reactor exit fluid to a further controlled quantity of diluent/coolant fluid; transferring heat from the exit fluid to a further quantity of diluent/coolant fluid; combining the heated diluent/coolant fluid with the exit fluid; and delivering the combined fluid as the remediation fluid.

37. The method of claim 34, further including: transferring heat from the exit fluid to the received diluent/coolant fluid; combining the heated diluent/coolant fluid with the exit fluid; and delivering the combined fluid as the remediation fluid.

38. The method of claim 34, further including delivering the remediation fluid to the polluted site through an injection well.

39. The method of claim 34, further including recovering the effluent fluid from the polluted site through an extraction well.

* * * * *